US009751760B2

(12) United States Patent
Coleman et al.

(10) Patent No.: US 9,751,760 B2
(45) Date of Patent: Sep. 5, 2017

(54) ATOMICALLY THIN CRYSTALS AND FILMS AND PROCESS FOR MAKING SAME

(71) Applicant: THE PROVOST, FELLOWS, FOUNDATION SCHOLARS & THE OTHER MEMBERS OF BOARD, OF THE COLLEGE OF THE HOLY & UNDIV. TRINITY OF QUEEN ELIZABETH NEAR DUBLIN, College Green, Dublin (IE)

(72) Inventors: Jonathan Coleman, Dublin (IE); Umar Khan, Dublin (IE)

(73) Assignee: The Provost, Fellows, Foundation Scholars, and the Other Members of Board of the College of the Holy and Undivided Trinity of Queen Elizabeth Near Dublin, Dublin (IE)

( * ) Notice: Subject to any disclaimer, the term of this patent is extended or adjusted under 35 U.S.C. 154(b) by 0 days.

(21) Appl. No.: 14/410,387

(22) PCT Filed: Jun. 28, 2013

(86) PCT No.: PCT/EP2013/063661
§ 371 (c)(1),
(2) Date: Dec. 22, 2014

(87) PCT Pub. No.: WO2014/001519
PCT Pub. Date: Jan. 3, 2014

(65) Prior Publication Data
US 2015/0321916 A1 Nov. 12, 2015

(30) Foreign Application Priority Data
Jun. 28, 2012 (EP) .................................... 12174038

(51) Int. Cl.
C01B 13/14 (2006.01)
C01B 19/04 (2006.01)
(Continued)

(52) U.S. Cl.
CPC ............ *C01B 13/145* (2013.01); *B82Y 30/00* (2013.01); *B82Y 40/00* (2013.01); *C01B 19/007* (2013.01);
(Continued)

(58) Field of Classification Search
CPC . C01B 31/04; C01B 31/0407; C01B 31/0415; C01B 2204/00; C01B 2204/02;
(Continued)

(56) References Cited

U.S. PATENT DOCUMENTS 4,822,560 A * 4/1989 Oyama .................... C22C 9/02
148/433
4,822,590 A 4/1989 Morrison et al.
(Continued)

FOREIGN PATENT DOCUMENTS

EP       0382339        8/1990
WO    2012/000287 A1   1/2012
WO    2012028724       3/2012

OTHER PUBLICATIONS

Stankovich, et al., Synthesis of graphene-based nanosheets via chemical reduction of exfoliated graphite oxide, Carbon 2007; 45: 1558-1565.*
(Continued)

Primary Examiner — Daniel C McCracken
(74) Attorney, Agent, or Firm — K&L Gates LLP

(57) ABSTRACT

The invention provides a process for exfoliating a 3-dimensional layered material to produce a 2-dimensional material, said process comprising the steps of mixing the layered material in a solvent to provide a mixture; applying energy,
(Continued)

for example ultrasound, to said mixture, and removing the energy applied to the mixture, such that sedimentation of the 2-dimensional material out of solution as a weakly re-aggregated, exfoliated 2-dimensional material is produced. The invention provides a fast, simple and high yielding process for separating 3-dimensional layered materials into individual 2-dimensional layers or flakes, which do not strongly re-aggregate, without utilising hazardous solvents.

7 Claims, 2 Drawing Sheets

(51) Int. Cl.

| | | |
|---|---|---|
| C01B 21/083 | (2006.01) | |
| H01B 1/08 | (2006.01) | |
| H01B 1/06 | (2006.01) | |
| H01B 1/10 | (2006.01) | |
| H01B 3/02 | (2006.01) | |
| H01B 3/10 | (2006.01) | |
| C01G 23/04 | (2006.01) | |
| C01G 25/02 | (2006.01) | |
| C01G 27/02 | (2006.01) | |
| C01G 33/00 | (2006.01) | |
| C01G 35/00 | (2006.01) | |
| C01G 37/02 | (2006.01) | |
| C01G 45/02 | (2006.01) | |
| C01G 41/02 | (2006.01) | |
| C01G 99/00 | (2010.01) | |
| C01G 47/00 | (2006.01) | |
| C01G 53/04 | (2006.01) | |
| C01G 49/02 | (2006.01) | |
| C01B 21/064 | (2006.01) | |
| C01G 31/02 | (2006.01) | |
| C01G 39/02 | (2006.01) | |
| C01G 55/00 | (2006.01) | |
| C01B 19/00 | (2006.01) | |
| C01G 1/02 | (2006.01) | |
| C01G 1/12 | (2006.01) | |
| C01B 31/04 | (2006.01) | |
| B82Y 30/00 | (2011.01) | |
| B82Y 40/00 | (2011.01) | |

(52) U.S. Cl.
CPC .......... *C01B 19/04* (2013.01); *C01B 21/0648* (2013.01); *C01B 21/083* (2013.01); *C01B 31/0469* (2013.01); *C01G 1/02* (2013.01); *C01G 1/12* (2013.01); *C01G 23/04* (2013.01); *C01G 25/02* (2013.01); *C01G 27/02* (2013.01); *C01G 31/02* (2013.01); *C01G 33/00* (2013.01); *C01G 35/00* (2013.01); *C01G 37/02* (2013.01); *C01G 39/02* (2013.01); *C01G 41/02* (2013.01); *C01G 45/02* (2013.01); *C01G 47/00* (2013.01); *C01G 49/02* (2013.01); *C01G 53/04* (2013.01); *C01G 55/004* (2013.01); *C01G 99/00* (2013.01); *H01B 1/06* (2013.01); *H01B 1/08* (2013.01); *H01B 1/10* (2013.01); *H01B 3/02* (2013.01); *H01B 3/10* (2013.01); *C01P 2002/01* (2013.01); *C01P 2002/20* (2013.01); *C01P 2004/03* (2013.01); *C01P 2004/04* (2013.01); *C01P 2004/24* (2013.01); *Y10T 428/2991* (2015.01)

(58) Field of Classification Search
CPC ............ C01B 2204/04; C01B 2204/06; C01B 2204/065; C01B 2204/20; C01B 2204/22; C01B 2204/24; C01B 2204/28; C01B 2204/30; C01B 2204/32
See application file for complete search history.

(56) References Cited

U.S. PATENT DOCUMENTS

| | | | | |
|---|---|---|---|---|
| 2008/0279756 | A1* | 11/2008 | Zhamu | ................ C01B 31/0423 423/448 |
| 2012/0308468 | A1* | 12/2012 | Choi | ..................... C01B 31/043 423/415.1 |
| 2015/0321916 | A1* | 11/2015 | Coleman | ............. C01B 21/0648 428/403 |

OTHER PUBLICATIONS

Pu, et al., Dispersion of graphene in aqueous solutions with different types of surfactants and the production of graphene films by spray or drop casting, Jouranl of the Taiwan Institute of Chemical Engineers 2012; 43: 140-146.*
Bissessur, Rabin et al., "Toward Pillared Layered Metal Sulfides, Intercalation of the Chalcogenide Clusters Co6Q8 (PR3)6 (Q=S, Se, and Te and R=Alkyl) into MoS2", Chemistry of Materials, vol. 8, (1996), pp. 318-320.
Coleman, Jonathan N., "Liquid-Phase Exfoliation of Nanotubes and Graphene", Advanced Functional Materials, vol. 19, (2009), pp. 3680-3695.
Coleman, Joanathan N. et al., "Two-Dimensional Nanosheets Produced by Liquid Exfoliation of Layered Materials", Science, vol. 331, (2011), pp. 568-571.
Cunningham, Graeme, "Solvent Exfoliation of Transition Metal Dischalcogenides: Dispersibility of Exfoliated Nanosheets Varies Only Weakly between Compounds", ACS NANO, vol. 6, No. 4, (2012), pp. 3468-3480.
Hernandez, Yenny et al., "Measurement of Multicomponent Solubulity Parameters for Graphene Facilitates Solvent Discovery", Langmuir, vol. 26, No. 5, (2010), pp. 3208-3213.
Hernandez, Yenny et al., "High-yield production of graphene by liquid-phase exfoliation of graphite", Nature Nanotechnology, vol. 3, (2008), pp. 563-568.
Khan, Umar et al., "High-Concentration Solvent Exfoliation of Graphene" small, vol. 6, No. 7, (2010), pp. 864-871.
Khan, Umar et al., "Size selection of dsipersed, exfoliated graphene flakes by controlled centrifugation", Carbon, vol. 50, (2012), pp. 470-475.
Khan, Umar et al., "Solvent-Exfoliated Graphene at Extremely High Concentration", Langmuir, vol. 27, (2011), pp. 9077-9082.
Smith, Ronan J. et al., "The importance of repulsive potential barriers for the dispersion of graphene using surfactants", New Journal of Physics, vol. 12, (2010), 125008, pp. 1-11.
PCT International Search Report and PCT Written Opinion for PCT International Application No. PCT/EP2013/063661 mailing date Oct. 14, 2013, (9 pgs.).

* cited by examiner

ATOMICALLY THIN CRYSTALS AND FILMS AND PROCESS FOR MAKING SAME

CROSS REFERENCE TO RELATED APPLICATIONS

This is the national phase under 35 U.S.C. §371 of International Application No. PCT/EP2013/063661 filed on Jun. 28, 2013, which claims priority to and benefit of European Application No. 12174038.5 filed on Jun. 28, 2012, the entire disclosures of each of which are incorporated by reference herein.

FIELD OF THE INVENTION

The invention relates to atomically thin 2-dimensional materials. In particular, the invention relates to 2-dimensional materials for use in electronic, semiconductor, and/or insulating devices, and a process for producing the 2-dimensional materials.

BACKGROUND TO THE INVENTION

A wide range of 2-dimensional (2-D) atomic crystals exist in nature. The simplest is graphene (an atomic-scale 2-D honeycomb lattice of carbon atoms), followed by Boron Nitride (BN). However, hundreds more exist including transition metal dichalcogenides (TMDs) such as Molybdenum disulphide ($MoS_2$), Niobium diselenide ($NbSe_2$), Vanadium telluride ($VTe_2$), transmission metal oxides such as Manganese dioxide ($MnO_2$) and other layered compounds such as Antimony telluride ($Sb_2Te_3$), Bismuth telluride ($Bi_2Te_3$). Depending on the exact atomic arrangement, these crystals can be metals, insulators or semiconductors.

Layered materials, come in many varieties with one family having the formula $MX_n$ (where M=Ti, Zr, Hf, V, Nb, Ta, Cr, Mn, Mo, W, Tc, Re, Ni, Pd, Pt, Fe, Ru; X=O, S, Se, Te; and $1 \leq n \leq 3$). A common group are the transition metal dichalcogenides (TMDs) which consist of hexagonal layers of metal atoms sandwiched between two layers of chalcogen atoms. While the bonding within these tri-layer sheets is covalent, adjacent sheets within a TMD crystal are weakly bound by van der Waals interactions. Depending on the co-ordination and oxidation state of the metal atoms, TMDs can be metallic or semiconducting. For example, Tungsten disulphide ($WS_2$) is a semiconductor while Tantalum disulphide ($TaS_2$) and Platinum telluride ($PtTe_2$) are metals. This versatility makes them potentially useful in many areas of electronics.

However, like graphene, many believe that TMDs must be produced as flakes dispersed in liquids to facilitate processability and prevent re-aggregation. TMDs can be exfoliated by ion intercalation, as described in EP 0382339 and U.S. Pat. No. 4,822,590. However, this method is time consuming, extremely sensitive to the environment and incompatible with the majority of solvents and so is unsuitable for most applications. Furthermore, removal of the ions results in re-aggregation of the layers (R. Bissessur, J. Heising, W. Hirpo, M. Kanatzidis, *Chemistry of Materials* 1996, 8, 318).

Recently, it has been shown by the Applicants that graphite can be exfoliated to give graphene by sonication in certain solvents and that TMDs can be exfoliated in the same manner [References 1-8 (PCT Publication No. WO 2012/0287 being reference 8)]. This process gives dispersions of nanosheets stabilised in suitable solvents. It is possible to produce at least 1 litre (at a time) of graphene dispersed in solvents such as NMP at a concentration of at least 1 mg/ml i.e. >1 g of exfoliated graphene, using these methods. This means that 1 kg of graphene would require up to 1 m³ of solvent. For any company making graphene, this would make shipping difficult and costly, unless the solvent was removed which is possible but not trivial.

However, there are a number of problems with the procedures outlined in References 1-8. The exfoliation is carried out in special solvents such as n-methyl pyrrolidone (NMP), cyclohexylpyrrolidone, di-methyl formamide etc. These solvents must have surface tension in the vicinity of 40 mJ/m² to match the surface energy (related to surface tension) of graphene. The reasoning behind the surface tension value is the energy cost of exfoliation (per volume of dispersion) of graphene which can be expressed as:

$$\frac{\Delta H_{Mix}}{V} \approx \frac{2}{T_{NS}}(\sqrt{E_{S,S}} - \sqrt{E_{S,G}})^2 \phi_G \quad (1)$$

where $T_{NS}$ is the thickness of the graphene sheet, $E_{s,s}$ is the surface energy of the solvent, $E_{s,G}$ is the surface energy of the graphene and $\phi_G$ is the volume fraction (proportional to concentration) of the graphene. The surface tension requirement is to allow the graphene or other TMDs to be stabilised against aggregation and means a limited number of good solvents exist. Typically solvents with surface tensions close to 40 mJ/m² are required to exfoliate most layered compounds (References 9-10). These solvents can also be expensive, difficult to remove due to high boiling points, and/or are toxic to the environment.

To remove the solvents after exfoliation, the mixture must be filtered through nanoporous membranes, which is very slow. Alternatively, a non-solvent or salt can be added to the mixture to destabilise the graphene, which sediments out and then can be collected. However, the solvent then has to be recycled which is slow and expensive.

Furthermore, Reference 8 (WO 2012/028724) describes that exfoliation is only possible in a water-surfactant mixture. It is believed that the surfactant is necessary for exfoliation and stabilisation of the exfoliated nanosheets. It is also believed that exfoliation and stabilisation cannot happen independently. While the document shows that vacuum filtration can be used to remove the solvent, this is only required because of the presence of the surfactant necessary to stabilise the exfoliated graphene. However, this process is slow and hard to scale.

EP 0382339 A1 does not describe a process of simply exfoliating a TMD in a simple solution. First of all, lithium ions must be intercalated between the layers of the TMD $MoS_2$. This is a very slow process that cannot be achieved in ambient conditions. It is not scalable. Only after the Li has been intercalated can the exfoliation in water begin. Although evaporation can be used to remove the solvent, this is a slow and/or energy intensive process.

U.S. Pat. No. 4,822,590 A does not describe a process that can simply be described as exfoliation in a simple solution. As with EP 0382339 A1 above, lithium ions must first be intercalated between the layers of the $MoS_2$. This is a very slow process that cannot be achieved in ambient conditions and it is not scalable. It is only after the lithium ions have been intercalated can the exfoliation begin. In the method of U.S. Pat. No. 4,822,590 A, centrifugation was used to remove the solvent. However, this is also a slow process of limited scalability.

There is therefore a need to provide two-dimensional atomic crystals by a suitable method or process to overcome at least one of the above-mentioned problems.

SUMMARY OF THE INVENTION

According to the present invention there is provided a process for exfoliating 3-dimensional layered material to produce a 2-dimensional material, said process comprising the steps of:
mixing the layered material in a solvent to provide a mixture;
applying energy, for example ultrasound, to said mixture to exfoliate the 3-dimensional layered material and produce dispersed exfoliated 2-dimensional material; and
removing the energy applied to the mixture, such that sedimentation of the 2-dimensional material out of solution as a weakly re-aggregated, exfoliated 2-dimensional material is produced.

According to the present invention, there is provided, as set out in the appended claims, a process for exfoliating 3-dimensional layered material to produce a 2-dimensional material, said process comprising the steps of:
mixing the layered material in water to provide a mixture;
applying energy, for example ultrasound, to said mixture to exfoliate the 3-dimensional layered material and produce dispersed exfoliated 2-dimensional material; and
removing the energy applied to the mixture, such that sedimentation of the 2-dimensional material out of solution as a weakly re-aggregated, exfoliated 2-dimensional material is produced.

The problem that is solved by the present invention is the provision of a method to exfoliate nanosheets in a manner which allows them to be easily dried for storage. None of the prior art documents discussed herein achieve this. The solution provided by the present invention involves a method which results in the exfoliation of layered material coupled with simple removal of the solvent, for example, water alone.

The process of the present invention can be surprisingly achieved by applying energy to graphite or indeed any layered material in any solvent which does not alone stabilise exfoliated nanosheets against re-aggregation. This embodies thousands of solvents. Examples of common organic solvents which do not disperse graphene are toluene, tetrahydrofuran, hexane, ethanol, methanol etc. In one embodiment of the present invention, the solvent may be water. Water is one of the most useful solvents for this process because it is safe and plentiful.

The surprising result of the present invention is that it is the antithesis of the current thinking behind exfoliation of 3-dimensional layered materials. It is generally implicitly believed that exfoliation of layered materials must be performed in solvents that can stabilise the exfoliated nanosheets against re-aggregation (for example, PCT Patent Publication No. WO 2012/028724). Thus, the perceived wisdom is that input of energy, usually by sonication, gives exfoliation with the exfoliated nanosheets stabilised via van der Waals interactions with appropriate solvents. The processes of exfoliation and stabilisation have been considered inseparable.

However, the inventors realised that these processes can be decoupled. Exfoliation can be achieved by sonication in solvents currently believed to be inappropriate for exfoliation and that simply cannot stabilise the exfoliated nanosheets. This means that once the sonic energy is turned off, the exfoliated nanosheets become unstable and sediment out of solution. However, the sediment is only weakly aggregated which allows easy redispersion.

An important aspect of the present invention is that hazardous chemicals can be avoided as the ideal solvent is water. The use of water was never considered previously due to its high surface tension (~70 mJ/m$^2$). The use of water is advantageous in that it avoids disposal or recycling of large quantities of potentially hazardous solvents. The process is safe, non-combustible and involves benign materials. In addition, the number of steps involved in the process is less than the methods and processes of the prior art.

Although ultrasound is the standard means to apply energy to 3-dimensional layered materials to produce exfoliated 2-dimensional material, other forms of energy or forces may be used, for example gravity, and similar energy forms or forces known to those skilled in the art.

The layered material to be exfoliated may be any 3-dimensional layered compound, for example transition metal dichalcogenide having the formula $MX_n$, or any other layered material such as graphite, transition metal oxides, boron nitride (BN), $Bi_2Te_3$, $Sb_2Te_3$, TiNCl, or any other inorganic layered compound. When the 3-dimensional transition metal dichalcogenide has the formula $MX_n$, M may be selected from the group comprising Ti, Zr, Hf, V, Nb, Ta, Cr, Mn, Mo, W, Tc, Re, Ni, Pd, Pt, Fe and Ru; X may be selected from the group comprising O, S, Se, and Te; and $1 \leq n \leq 3$.

During the step of applying energy, the mixture comprises a dispersion of 2-dimensional nanosheets. However, once the energy supply (e.g. sonic energy) is removed, the flakes become unstable and the nanosheets sediment to the bottom of the vessel. During sedimentation, they aggregate weakly to form a loose powder at the bottom of the vessel. The vast majority of the solvent can be removed by pipette or decantation to give a damp powder.

In one embodiment of the invention, the process may further comprise the step of removing the residual solvent from the re-aggregated exfoliated 2-dimensional material to form a dry solid of re-aggregated exfoliated 2-dimensional material. The step of forming the dry solid of re-aggregated exfoliated 2-dimensional material may be by decantation, vacuum filtration or by processes such as accelerated evaporation (heating, application of a vacuum etc).

In one embodiment of the invention, the dry solid of re-aggregated exfoliated 2-dimensional material may be washed with a volatile liquid selected from the group comprising methanol, ethanol, propanol, acetone etc. The use of the volatile liquid removes the solvent from the material and as the volatile liquid evaporates, the material is dry and relatively free of solvent.

In one embodiment of the present invention, the (dry solid) re-aggregated exfoliated 2-dimensional material may be graphene.

The dry solid of re-aggregated exfoliated 2-dimensional material is suitable for storage. This permits the manufacture of industrial-scale graphene which can be stored and transported in solid or powder form, thus overcoming the problem faced with current methods of transporting and storing graphene sheets.

However, this powder can very easily be redispersed in suitable solvents. In one embodiment of the present invention, the process may further comprise the step of re-dispersing the solid of re-aggregated exfoliated 2-dimensional material in any one of the solvents selected from the group comprising n-methyl pyrrolidone (NMP), cyclohexylpyrrolidone, di-methyl formamide, Cyclopentanone (CPO), Cyclohexanone, N-formyl piperidine (NFP), Vinyl pyrrolidone (NVP), 1,3-Dimethyl-2-imidazolidinone (DMEU), Bromobenzene, Benzonitrile, N-methyl-pyrrolidone (NMP), Benzyl Benzoate, N,N'-Dimethylpropylene urea, (DMPU), gamma-Butrylactone (GBL), Dimethylformamide (DMF), N-ethyl-pyrrolidone (NEP), Dimethylacetamide (DMA), Cyclohexylpyrrolidone (CHP), DMSO, Dibenzyl ether, Chloroform, Isopropylalcohol (IPA), Cholobenzene, 1-Octyl-2-pyrrolidone (N8P), 1-3 dioxolane, Ethyl acetate, Quinoline, Benzaldehyde, Ethanolamine, Diethyl phthalate, N-Dodecyl-2-pyrrolidone (N12P), Pyridine, Dimethyl phthalate, Formamide, Vinyl acetate, Acetone etc, or a water-surfactant solution.

In one embodiment of the present invention, the water-surfactant solution comprises a solution of water and a surfactant selected from the group comprising sodium cholate (NaC), sodium dodecylsulphate (SDS), sodium dodecylbenzenesulphonate (SDBS), lithium dodecyl sulphate (LDS), deoxycholate (DOC), taurodeoxycholate (TDOC), polyoxyethylene (40) nonylphenyl ether, branched (IGEPAL CO-890® (IGP)), polyethylene glycol p-(1,1,3,3-tetramethylbutyl)-phenyl ether (Triton-X 100® (TX-100)).

In one embodiment of the present invention, the process may further comprise the step of applying energy, for example ultrasound, to the re-dispersed solid of re-aggregated exfoliated 2-dimensional material. The energy may be applied for any suitable time, for example, from 30 seconds to 10 hours, from 1 minute to 1 hour, preferably from 5 minutes to 45 minutes, more preferably from 10 minutes to 30 minutes, and ideally about 15 minutes. This gives graphene dispersions at concentrations of about 1 mg/ml after about 15 minutes.

In one embodiment, the energy may be applied for 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 minutes.

In a further embodiment of the present invention, there is provided a solid of re-aggregated exfoliated 2-dimensional material produced by the process as described above.

In another embodiment of the present invention, there is provided a device comprising exfoliated layered material produced by the process described above. The device may be a thin film of transition metal dichalcogenides on a substrate, or the device may be a component coated by the exfoliated layered material. The device may be selected from, but not limited to, the group comprising electrodes, transparent electrodes, capacitors, transistors, solar cells, light emitting diodes, thermoelectric devices, dielectrics, batteries, super capacitors, nano-transistors, nano-capacitors, nano-light emitting diodes, and nano-solar cells.

In the specification, the term "solid of re-aggregated exfoliated 2-dimensional material" can be interpreted as being in the form of a powder. The terms "solid of re-aggregated exfoliated 2-dimensional material" and "powder" can be used interchangeably without altering the interpretation of the terms.

The production of nanosheets and thin films of the present invention provide an invaluable source of metallic, semiconducting, or insulating material for use in the preparation of electronic and nano-electronic devices.

The significant advantage of the claimed invention over the prior art documents described above is that sonication in, for example, water exfoliates layered materials (that is, creates nanosheets of, for example, graphene) but does not stabilise those nanosheets. The current application shows that exfoliation can happen in water with no surfactant under the application of ultrasound. This means when the power is turned off, the nanosheets fall to the bottom of the vessel; and the water can be decanted off if preferred so that no filtration is needed. Furthermore, no intercalation is necessary to carry out the method and arrive at the desired result. Avoiding intercalation removes the rate limiting step from the process. The method of the claimed invention is also simple, faster and scalable.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

This invention provides a fast, simple and high yielding process for separating multilayered 3-D crystalline compounds (for example, TMDs) into individual 2-dimensional layers or flakes without utilising hazardous solvents. The separated 3-dimensional crystalline layered compound (for example, TMDs) can be formed into thin films, quickly, inexpensively and easily from liquid dispersions. The thin films have metallic, semiconducting or insulating properties, depending on the starting material. These 2-dimensional materials are ideal building blocks for nano-electronic devices. For example, where the 2-D crystals of the present invention in thin film form are metallic, semiconducting or insulating, they can be used for, respectively:

(i) electrodes or transparent electrodes in displays, windows, capacitors, devices etc.
(ii) devices such as transistors, solar cells, light emitting diodes, thermoelectric devices;
(iii) dielectrics in capacitors, gate dielectrics in transistors, etc; and
(iv) electrodes or other parts in batteries or super-capacitors etc.

Where the 2-D crystals of the present invention in individual flake form are metallic, semiconducting or insulating, they can be used for, respectively:

(i) electrodes in nanoscale devices such as nano-transistors, nano-capacitors, nano light emitting diodes, nano solar cells, etc.;
(ii) active layers in nano-devices such as nano transistors, nano solar cells, nano light emitting diodes, etc.; and
(iii) dielectrics in nano capacitors, gate dielectrics in nano transistors, etc.

The Applicant has hypothesised that the dispersion of graphene in solvents is a two-step process, where the first step involves using sonic energy to break up the graphite to give graphene while the second step involves the graphene interacting with the solvent to stabilise it against aggregation. These processes have been implicitly assumed to be inseparable. However, the Applicant realised that these steps might be independent. That is, that the sonication could be carried out in a solvent that does not fulfil the criterion described in formula (1) i.e. is not a good solvent to stabilise exfoliated graphene. In this scenario, sonication would give graphene but the graphene would not be stabilised against aggregation. Importantly, although the graphene would re-aggregate, the sheets would stick together only loosely, as when graphene dispersed in good solvents such as NMP is filtered to form a film (i.e. a very large aggregate), Raman spectroscopy shows the flakes to retain some of the character of individual flakes (or few layer flakes) (see Reference 5).

Figure 1:
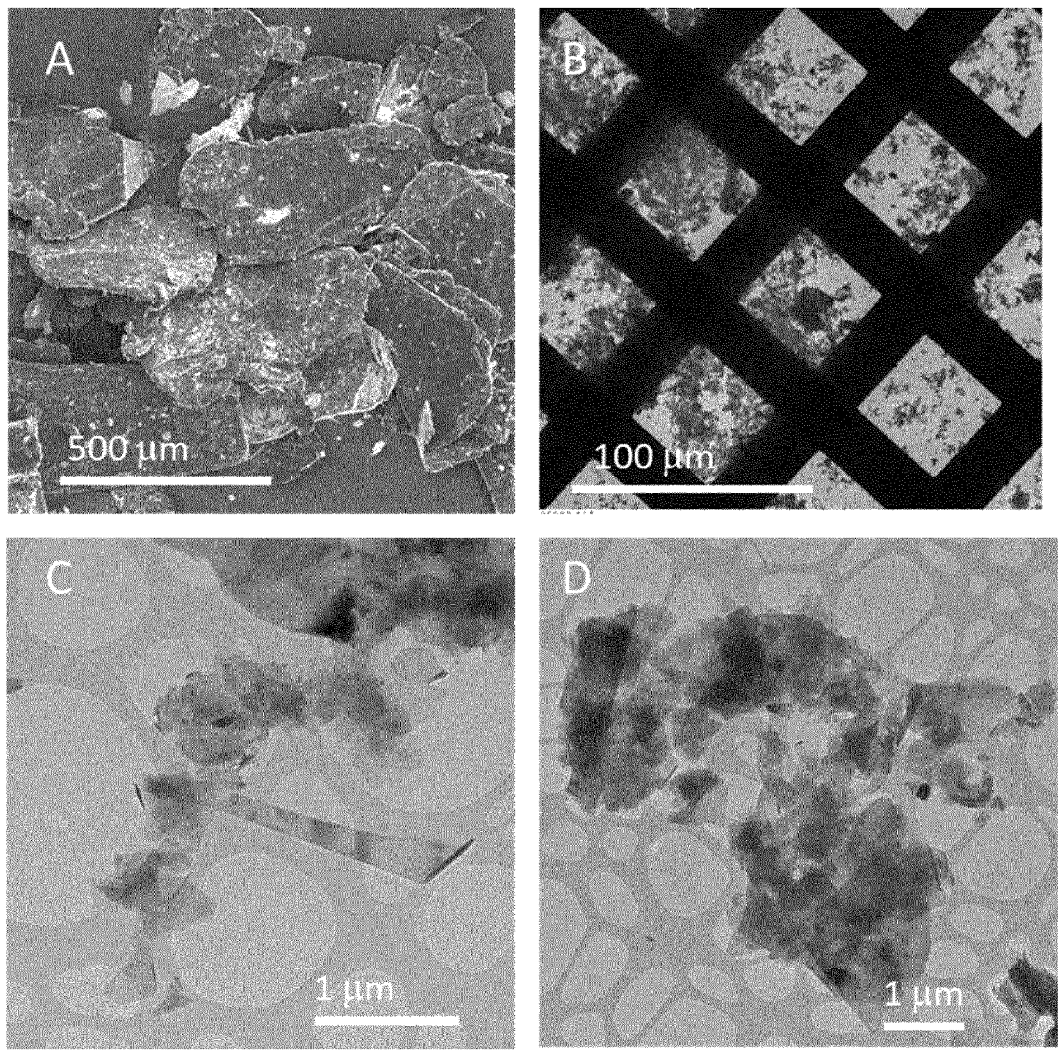
FIG. 1 shows (A) a SEM image of starting graphite; (B) and (C) show TEM images of dispersion immediately after sonic energy is turned off; and (D) shows a TEM image of dispersion 20 mins after sonic energy was turned off.

The Applicant has tested this hypothesis by sonicating graphite (8 grams sourced from Sigma Aldrich) in deionised water (80 ml) using a sonic tip (Ultra sonic processor GEX600 watt from Sonics and Materials Inc. used with the flathead probe) for various times from 3 to 16 hr. An SEM image of the starting graphite is shown in FIG. 1A. It consists of crystallites approximately a few hundred microns in size. After 16 hours the sonic power was turned off and a droplet immediately removed from the top of the vessel for microscopic analysis. FIG. 1B shows a widefield transmission electron micrograph (TEM) of the material contained in this drop after deposition on a TEM grid. It is clear from this image that the starting graphite has been broken up into much smaller pieces. Zooming in on the drop (FIG. 1C) shows very small, thin objects at the bottom left of the image. These are graphene sheets. The image in FIG. 1C clearly and surprisingly illustrates that sonication in a solvent exfoliates graphite to graphene. A droplet was also removed after 20 minutes and a typical TEM image was taken and is shown in FIG. 1D. The majority of graphene had aggregated by this time showing the exfoliated graphene to be unstable in water. After 20 minutes (FIG. 1D), it was clear by observing the changing colour of the dispersion that the graphene was sedimenting from the water.

After sedimentation, the solvent can be removed by decantation or pipetting with residual solvent removed by filtration. Alternatively, this sedimentation process can be accelerated by filtration onto a nano-porous membrane. Both procedures give a black powder which can be further washed with a volatile solvent such as methanol. The dried black powder can be stored easily. This makes it ideal for handling or shipping. It can also be used as a starting material which could be re-dispersed in good solvents such as NMP. To do this, the pre-treated black powder (that is graphene sonicated in water or any other non-dissolving solvent for a period of time) was sonicated in NMP for 15 minutes using an Ultra sonic processor GEX600 watt (by Sonics and Materials, Newtown Conn., USA, used with the flathead probe). Every three minutes a small volume was removed, centrifuged at 2000 rpm for 45 minutes (using a Hettich Mikro 22R) and the concentration of graphene measured by optical absorbance spectroscopy. This procedure was carried out for graphite samples pre-treated in water for 3, 4, 8 and 16 hours.

Figure 2:
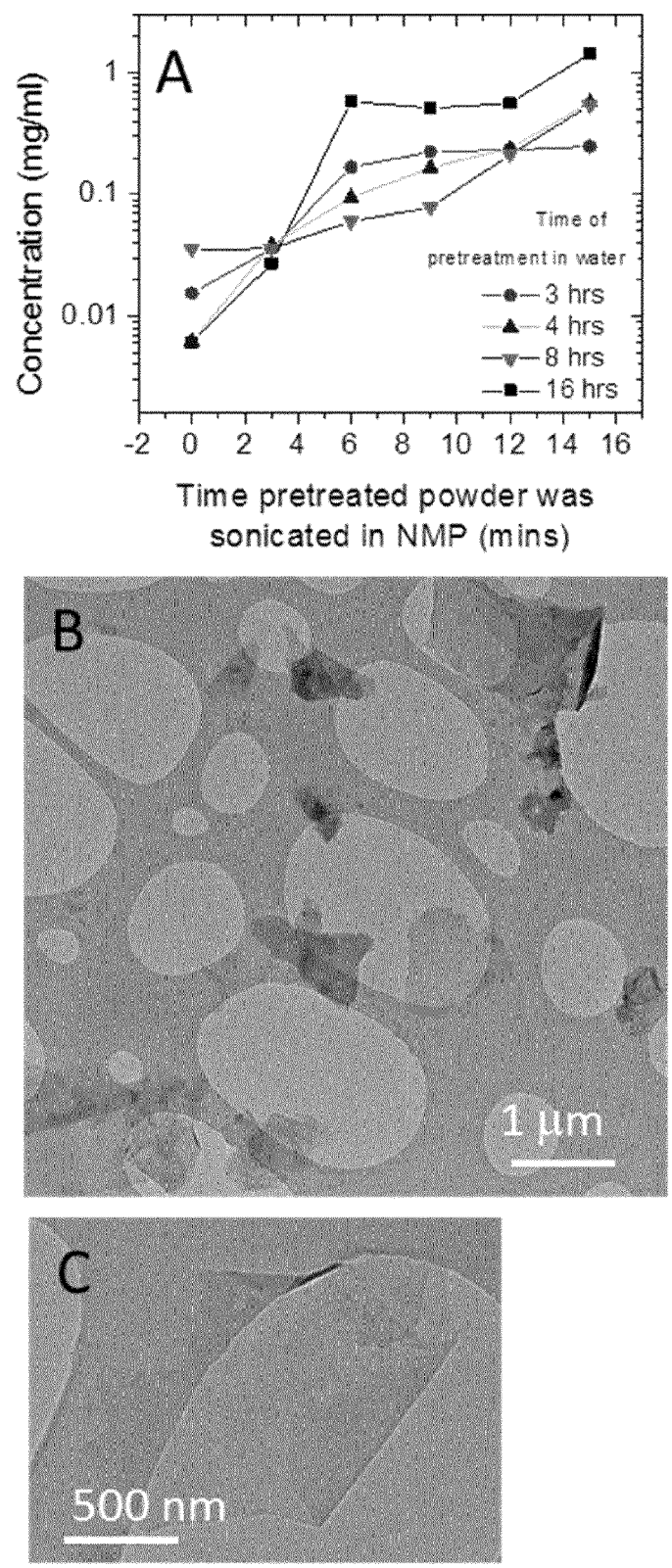
FIG. 2 describes how the reaggregated powder can be redispersed in solvents such as NMP. Shown in (A) is a graph of concentration of dispersed graphene plotted against sonication time (in NMP). This was done for 4 different samples prepared by different pre-treatment times in water; and (B) and (C) show TEM images of dispersion after 15 minutes of sonication.

FIG. 2A shows a graph of the measured concentration of graphene in NMP as a function of sonication time in NMP for 4 samples which have received different periods of sonication in water (i.e. pre-treatments). It is clear from this data that the dispersed concentration increases extremely rapidly once the pre-treatment had been performed. A concentration of 1 mg/ml was achieved after 15 minutes. This was a surprising result in view of the standard procedures of the prior art. To put this in context of sonicating normal graphite in accordance with the current methods, it takes 10 s of hours with a sonic tip or 100s of hours with a sonic bath to achieve 1 mg/ml. The dispersion after 15 minutes of sonication was examined and the results are shown in FIGS. 2B and 2C. The results found large quantities of extremely thin graphene flakes. It was surprising to find that the quality of the dispersion corresponds to those produced using standard procedures.

The process described herein could be used to speed up or simplify graphene production on an industrial or large scale. Alternatively, the pre-treatment could be used to prepare a product which could be stored or shipped to customers allowing them to sonicate and produce graphene easily in their lab/factory.

In the specification the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiments hereinbefore described but may be varied in both construction and detail.

REFERENCES

[1] Coleman J N. Liquid-Phase Exfoliation of Nanotubes and Graphene. Advanced Functional Materials. 2009; 19(23):3680-95.
[2] Khan U, O'Neill A, Lotya M, De S, Coleman J N. High-Concentration Solvent Exfoliation of Graphene. Small. 2010; 6(7):864-71.
[3] Smith R J, Lotya M, Coleman J N. The importance of repulsive potential barriers for the dispersion of graphene using surfactants. New Journal of Physics. 2010; 12:125008.
[4] Khan U, O'Neill A, Porwal H, May P, Nawaz K, Coleman J N. Size selection of dispersed, exfoliated graphene flakes by controlled centrifugation. Carbon. 2012; 50(2):470-5.
[5] Khan U, Porwal H, O'Neill A, Nawaz K, May P, Coleman J N. Solvent-Exfoliated Graphene at Extremely High Concentration. Langmuir. 2011; 27(15):9077-82.
[6] Hernandez Y, Lotya M, Rickard D, Bergin S D, Coleman J N. Measurement of Multicomponent Solubility Parameters for Graphene Facilitates Solvent Discovery. Langmuir. 2010; 26(5):3208-13.
[7] Hernandez Y, Nicolosi V, Lotya M, Blighe F M, Sun Z Y, De S, et al. High-yield production of graphene by liquid-phase exfoliation of graphite. Nature Nanotechnology. 2008; 3(9):563-8.
[8] International Patent Publication No. WO 2012/028724.
[9] Cunningham, G et al ACS NANO, 6(4), pp. 3468-3480 (2012).
[10] Coleman et al SCIENCE, vol. 331, 6017, pp. 568-571 (2011).

The invention claimed is:
1. A process for exfoliating a 3-dimensional layered material to produce a 2-dimensional material, said process comprising the steps of:
mixing the layered material in water to provide a mixture without the use of a surfactant;
applying energy to said mixture to exfoliate the 3-dimensional layered material and produce dispersed exfoliated 2-dimensional material;
removing the energy applied to the mixture, such that sedimentation of the 2-dimensional material out of solution as a weakly re-aggregated, exfoliated 2-dimensional material is produced; and removing the water from the re-aggregated exfoliated 2-dimensional material to form a solid of re-aggregated exfoliated 2-dimensional material ready for storage, wherein the 3-dimensional layered material is selected from the group consisting of graphite, a transition metal dichalcogenide (TMD), transition metal oxides, boron nitride (BN), $Bi_2Te_3$, $Sb_2Te_3$, TiNCl, or any other inorganic layered compound, wherein the step of removing the water is by decantation, vacuum filtration or accelerated evaporation, and wherein the re-aggregated exfoliated 2-dimensional material is washed with a volatile liquid selected from the group consisting of methanol, ethanol, propanol or acetone.

2. A process according to claim 1, further comprising the step of re-dispersing the re-aggregated exfoliated 2-dimensional material in any one of the solvents selected from the group consisting of n-methyl pyrrolidone (NMP), cyclohexylpyrrolidone, di-methyl formamide, Cyclopentanone (CPO), Cyclohexanone, N-formyl piperidine (NFP), Vinyl pyrrolidone (NVP), 1,3-Dimethyl-2-imidazolidinone (DMEU), Bromobenzene, Benzonitrile, N-methyl-pyrrolidone (NMP), Benzyl Benzoate, N,N'-Dimethylpropylene urea, (DMPU), gamma-Butrylactone (GBL), Dimethylformamide (DMF), N-ethyl-pyrrolidone (NEP), Dimethylacetamide (DMA), Cyclohexylpyrrolidone (CHP), DMSO, Dibenzyl ether, Chloroform, Isopropylalcohol (IPA), Cholobenzene, 1-Octyl-2-pyrrolidone (N8P), 1-3 dioxolane, Ethyl acetate, Quinoline, Benzaldehyde, Ethanolamine, Diethyl phthalate, N-Dodecyl-2-pyrrolidone (N12P), Pyridine, Dimethyl phthalate, Formamide, Vinyl acetate, Acetone, or a water-surfactant solution.

3. A process according to claim 2, wherein the water-surfactant solution comprises a solution of water and a surfactant selected from the group consisting of sodium cholate (NaC), sodium dodecylsulphate (SDS), sodium dodecylbenzenesulphonate (SDBS), lithium dodecyl sulphate (LDS), deoxycholate (DOC), taurodeoxycholate (TDOC), polyoxyethylene (40) nonylphenyl ether, polyethylene glycol p-(1,1,3,3-tetramethylbutyl)-phenyl ether (Triton-X 100® (TX-100)).

4. A process according to claim 2, further comprising the step of applying energy to the re-dispersed re-aggregated exfoliated 2-dimensional material.

5. A process according to claim 1, wherein the layered materials have the formula $MX_n$, where $1 \le n \le 3$.

6. A process according to claim 1, wherein the layered materials have the formula $MX_n$, where $1 \le n \le 3$ and wherein M is selected from the group consisting of Ti, Zr, Hf, V, Nb, Ta, Cr, Mn, Mo, W, Tc, Re, Ni, Pd, Pt, Fe and Ru, and X is selected from the group consisting of O, S, Se, and Te.

7. A process according to claim 1, wherein the applied energy is ultrasound.

* * * * *